No. 736,612. PATENTED AUG. 18, 1903.
F. P. LEDREUX.
EMBROIDERY MACHINE.
APPLICATION FILED JAN. 2, 1901.
NO MODEL. 10 SHEETS—SHEET 1.

Fig. 1.

WITNESSES:
INVENTOR
Florent Pierre Ledreux
BY Richardson
ATTORNEYS

No. 736,612. PATENTED AUG. 18, 1903.
F. P. LEDREUX.
EMBROIDERY MACHINE.
APPLICATION FILED JAN. 2, 1901.
NO MODEL. 10 SHEETS—SHEET 3.

No. 736,612. PATENTED AUG. 18, 1903.
F. P. LEDREUX.
EMBROIDERY MACHINE.
APPLICATION FILED JAN. 2, 1901.
NO MODEL. 10 SHEETS—SHEET 4.

No. 736,612. PATENTED AUG. 18, 1903.
F. P. LEDREUX.
EMBROIDERY MACHINE.
APPLICATION FILED JAN. 2, 1901.
NO MODEL. 10 SHEETS—SHEET 5.

Fig. 4.$^a$

WITNESSES:
Isabella Waldron
Adelaide Claire Gleason.

INVENTOR.
Florent Pierre Ledreux
BY
Richardson
ATTORNEYS

No. 736,612. PATENTED AUG. 18, 1903.
F. P. LEDREUX.
EMBROIDERY MACHINE.
APPLICATION FILED JAN. 2, 1901.
NO MODEL.
10 SHEETS—SHEET 7.

No. 736,612. PATENTED AUG. 18, 1903.
F. P. LEDREUX.
EMBROIDERY MACHINE.
APPLICATION FILED JAN. 2, 1901.
NO MODEL. 10 SHEETS—SHEET 8.

WITNESSES:

INVENTOR
ATTORNEYS

No. 736,612.                                                    Patented August 18, 1903.

UNITED STATES PATENT OFFICE.

FLORENT PIERRE LEDREUX, OF PARIS, FRANCE.

EMBROIDERY-MACHINE.

SPECIFICATION forming part of Letters Patent No. 736,612, dated August 18, 1903.

Application filed January 2, 1901. Serial No. 41,782. (No model.)

*To all whom it may concern:*

Be it known that I, FLORENT PIERRE LE-DREUX, trimming manufacturer, of 17 Rue de l'Entrepôt, in the city of Paris, Republic of France, have invented Improvements in Embroidery-Machines, of which the following is a full, clear, and exact description.

This invention has for its object an apparatus capable of being mounted on any machine designed for making the chain-stitch for the purpose of permitting the said machine to apply mechanically embroidery, and more particularly beaded or pearled embroidery, to fabrics of all kinds.

The machine provided with my improved apparatus fixes mechanically onto any desired fabric or the like the embroidering-thread (consisting either of a thread carrying beads or pearls or of a cord or a twist, &c.) by a chain-stitch formed by a binding-thread by means of needles passing through the said fabric or the like.

My invention is characterized more particularly by the application of a special apparatus permitting each needle to pass through the fabric to seize the binding-thread which is to hold the embroidering-thread and to return to the rear, at the same time passing this binding-thread through the fabric to form the chain-stitch. This apparatus comprises a bar or straight-edge arranged in front of the rack which guides the needles and a suitable distance from the said rack in such a manner as to leave a free space for the passage of the fabric. This bar or straight-edge, which is designed to present a rigid surface to the fabric at the moment when the needles pass through it, is, moreover, provided with a stop or projection termed a "press," which serves to close the hook of the needles when the latter return to the rear and to thus permit their passage through the fabric in this retrograde movement.

In order to fix the ideas, I will describe a machine arranged in accordance with my invention and serving to apply beaded or pearled embroidery onto any desired fabric, reference being had to the accompanying drawings, in which—

Fig. 4 is a transverse section on the line A B, Fig. 1. Fig. 4$^a$ is a further sectional view showing many of the parts shown in Fig. 4 and other parts not shown in said figure. Fig. 4$^b$ is a detail view showing the manner of operating the needle-holder. Figs. 10 to 13 show a modification in which the press is movable in a vertical direction for the purpose of only allowing it to act on the needles on the retrograde motion of the latter.

In the figures like letters of reference indicate corresponding parts.

As shown in the drawings, the needles $a$ are fitted into a needle-holder $a'$, which receives a reciprocating motion from the rear to the front and from front to rear from a longitudinal shaft $b$, operated through bevel-gearing from a main driving-shaft $c$, actuated by hand or by any suitable motor. For this purpose the needle-holder $a'$ is provided with arms $a^2$, bearing antifriction-rollers $a^\times$, on which act, respectively, a central cam $b'$ and two outer cams $b^2$, keyed onto the shaft $b$. Of these cams the first, $b'$, serves to move the needle-holder $a'$ forward and the others, $b^2$, to bring it back to the rear. The ends of the needles $a$ engage in the notches or spaces of a fixed rack $d$, which notches serve as guides for the needles—that is to say, the notches of the rack $d$ are for the purpose of retaining the loop formed by the thread around each needle and to disengage these loops from their respective needles when the latter return to the rear. In front of this rack $d$ is mounted a fixed bar or straight-edge $e$. A free space of suitable width is arranged between this bar $e$ and the rack $d$ for the passage of the fabric onto which the embroidery is to be applied. The lower edge of the fixed bar or straight-edge $e$ presents a rigid surface to the fabric at the part where it is to be pierced by the needles.

The bar $e$ is provided at its lower part with notches for the passage of the needles. These notches correspond to those in the rack $d$.

The bar $e$ is fixed onto a frame $e'$, which bears at its lower part a projection or press $e^2$, which is designed to keep the hook of the needles closed when the latter return to the rear in order to prevent the said hook from hooking into the fabric in its retrograde motion.

The fabric to be embroidered, more especially when it is of small width—such as lace, for example—is guided by a sheath or guideway $e^3$, fixed onto the bar or straight-edge.

Figure 1:
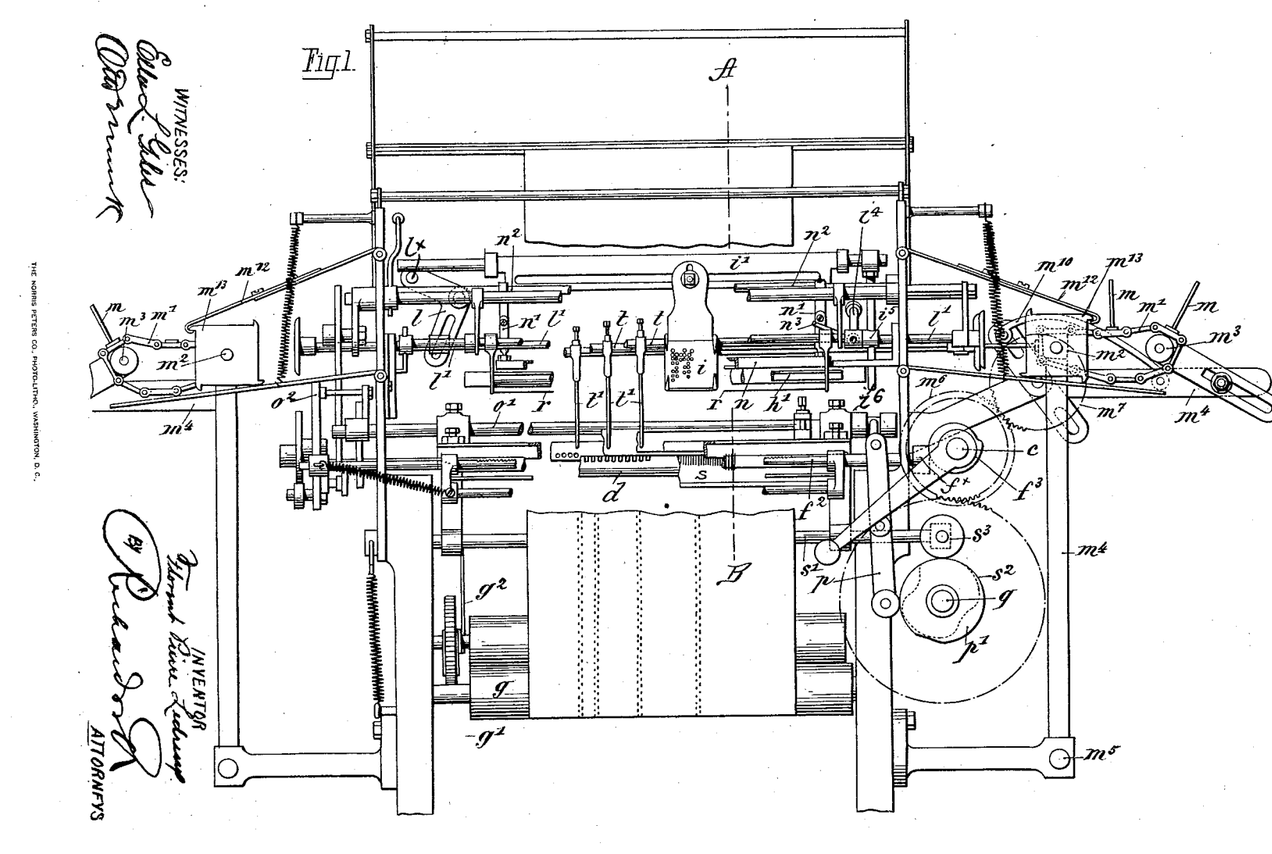
Figure 1 is a front view of the machine.
Figure 2:
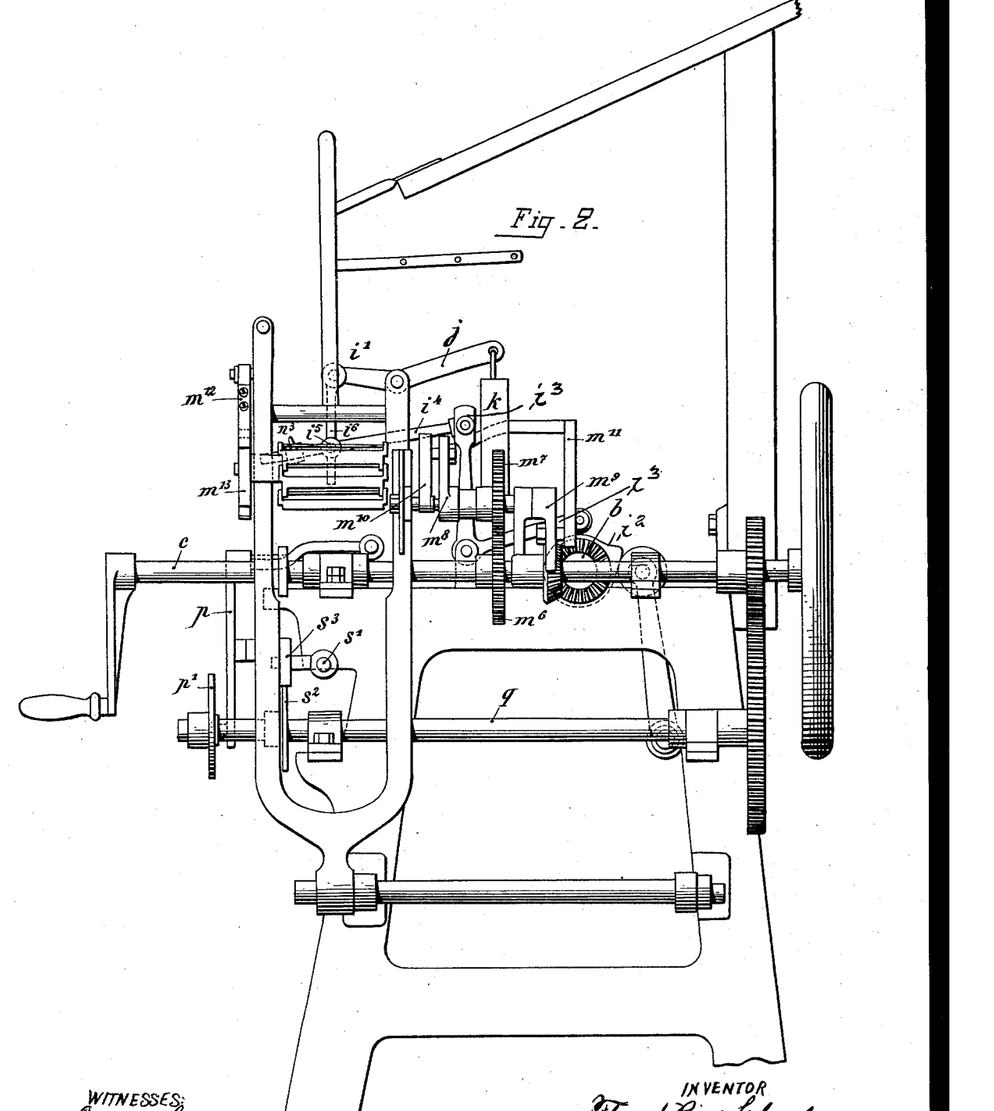
Fig. 2 is a side elevation.
Figure 3:
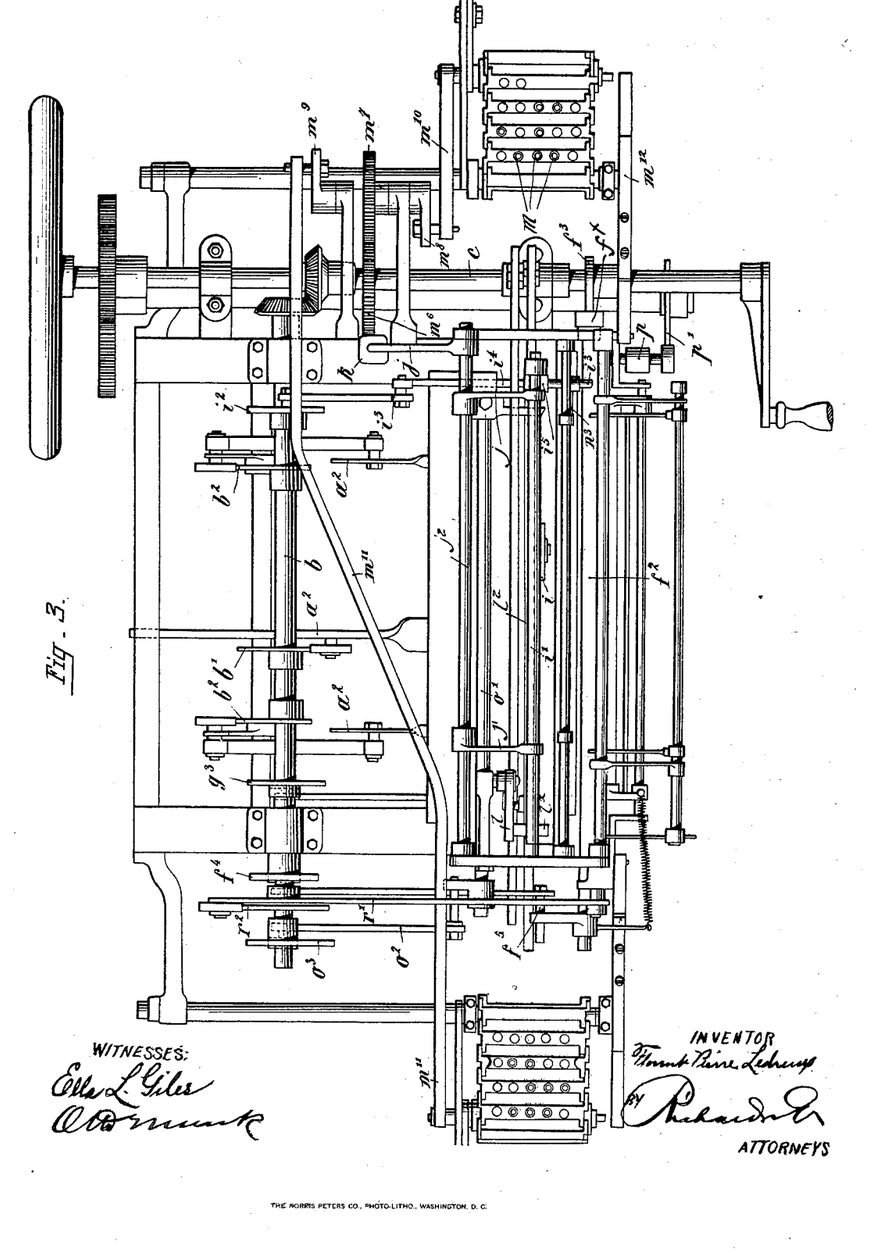
Fig. 3 is a plan.
Figures 4, 4B:
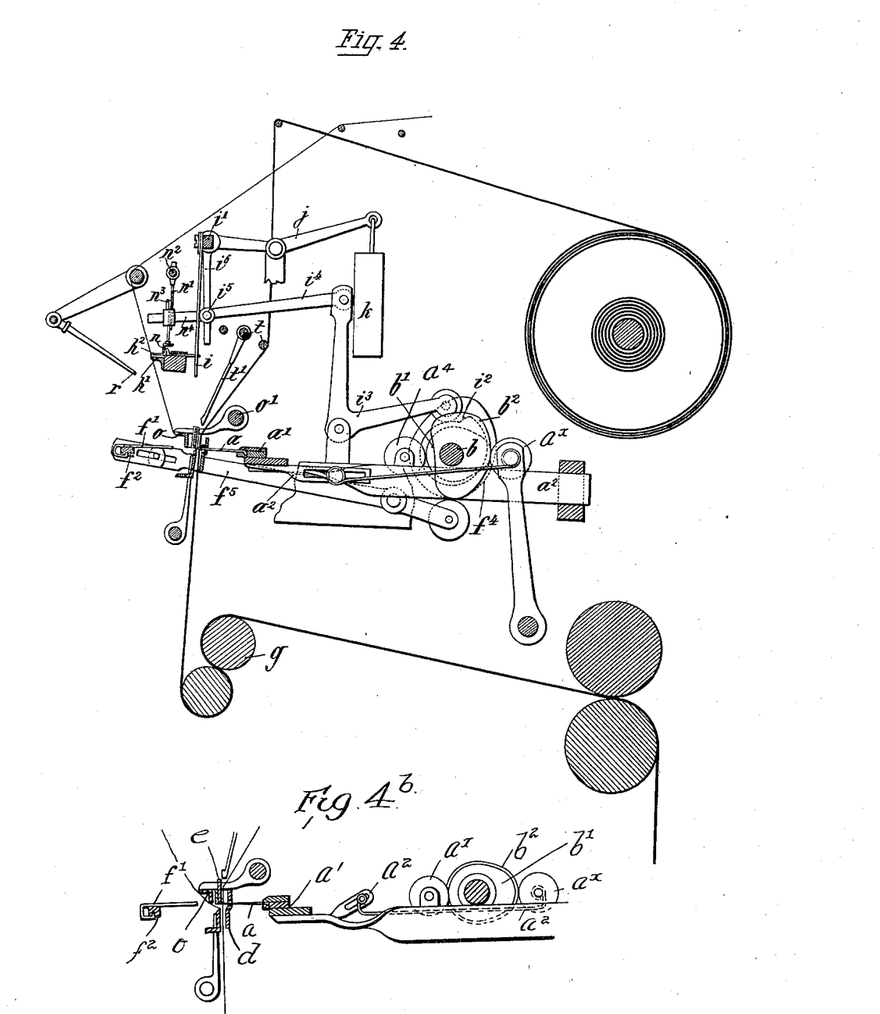
Figure 4A:
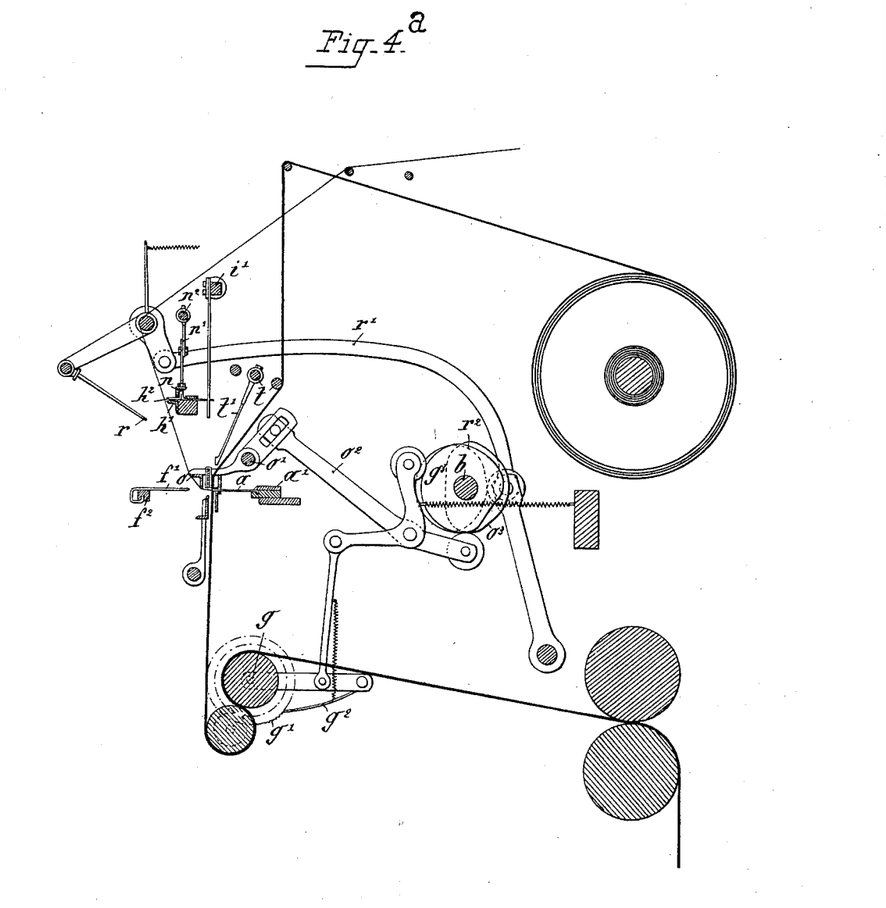

Each needle $a$ at the end of its forward travel seizes a binding-thread $f$, which is presented to it by a looper $f'$, to form the chain-stitch which is to be fixed, as well as the thread bearing the beads or pearls, on the fabric, as will be hereinafter explained. The looper is mounted on a shaft $f^2$, which receives a double motion—viz., a longitudinal displacement and an angular displacement—about its axis in such a manner that the looper $f'$ in passing over the needles $a$ places the binding-thread on the latter, to be seized by the hook of the needle, onto which it has been placed during the retrograde movement of the needles. The longitudinal displacement of the shaft $f^2$ is controlled by a cam $f^3$, keyed onto the driving-shaft $c$, and the said shaft $f^2$ receives its angular displacement from a cam $f^4$, keyed on the transmission-shaft $b$ and acting on a lever $f^5$, mounted on the shaft $f^2$. The cam $f^3$ is shown in Figs. 1 and 3 as engaging the end or head $f^\times$ of the shaft $f^2$.

At each termination of the retrograde travel of the needles the fabric moves forward through a certain distance. For this purpose the fabric is moved by a roller or shaft $g$, the axis of which bears a ratchet-wheel $g'$, with which engages a pawl $g^2$, actuated by a cam $g^3$, keyed onto the transmission-shaft $b$.

To each needle $a$ corresponds a thread $h$, carrying the beads or pearls. Each thread, rolled on a bobbin, passes over a counting-comb $h'$, which is fixed and serves to retain the beads or pearls. The beads or pearls are distributed one by one at the desired moment by small forks $h^2$, which are independent of each other, and receive a forward motion from a jacquard mechanism. These forks are moved forward by plates $i$, mounted on a shaft $i'$, which receives an angular motion about its axis. This angular displacement is controlled by a cam $i^2$, keyed onto the transmission-shaft $b$. This cam actuates a bent lever $i^3$, which acts on the rod $i^4$. The latter bears a sleeve $i^5$, through which passes loosely an arm $i^6$, fixed on the shaft $i'$. The plates $i$ are provided with holes corresponding to the forks, which are not to move—that is to say, to the stitches which are not to have beads or pearls. As each beaded or pearled pattern comprises a certain number of rows of stitches these plates comprise a corresponding number of rows of holes combined in accordance with the pattern to be produced, and the plates $i$ successively present these different rows opposite the rear ends of the forks $h^2$. For this purpose the shaft $i'$, which bears the plates $i$, receives a vertical displacement. The shaft $i'$, which is carried by levers $j$ and balanced by counterweights $k$, receives this vertical displacement from a bent lever $l$, which has a pin $l^\times$, Fig. 1, bearing against the lower edge of the shaft $i'$. The other arm of this lever $l$ is pivotally connected to a connecting-rod $l'$, which receives a series of successive displacements, first toward the left to effect the upward movement of the shaft $i'$ and afterward to the right to return the latter to its initial position. This longitudinal movement of the rod $l'$ is given through the tappets $m$. These successive displacements are controlled in the following manner: Opposite each end of the connecting-rod $l'$ blocks $m$ of increasing length are fixed on an endless chain $m'$, passing over two drums $m^2$ and $m^3$. These two drums are mounted on a support $m^4$, which is capable of oscillating about an axis $m^5$, and the two supports $m^4$ receive a reciprocating motion from the driving-shaft $c$ through toothed wheels $m^6$ $m^7$, the two cranks $m^8$ $m^9$, and the two connecting-rods $m^{10}$ $m^{11}$, which are each pivotally connected to one of the supports $m^4$. At each retrograde motion of the supports $m^4$ each of the endless chains $m'$ receives a motion controlled by a fixed pawl $m^{12}$, which acts on a ratchet-wheel $m^{13}$, rigidly attached to the drum $m^2$ and serving to substitute one block for another. Under these conditions the connecting-rod $l'$ is drawn either toward the left or toward the right each time that a block $m$ is presented by one of the endless chains $m'$ opposite the right-hand or left-hand end of the connecting-rod $l'$. When the connecting-rod $l'$ is to remain immovable, neither of the endless chains presents a block opposite the end of this connecting-rod. The forks $h^2$, which have been pushed forward by the plates $i$, are brought back to their initial position by a cross-piece $n$, which abuts against a tooth on these forks. This cross-piece $n$, which is carried by the arms $n'$, can oscillate about the shaft $n^2$ and is driven at the desired moment by a block $n^3$, fixed on the connecting-rod $i^4$. The threads $h$, carrying the beads or pearls, after having left the counting-comb $h'$ pass onto a movable comb $o$, which brings these threads $h$ into position to be seized by the binding-threads $f$ in the formation of the chain-stitch. This comb $o$, mounted on a horizontal shaft $o'$, successively receives the following movements: first, an angular displacement from above downward for the purpose of inclining the threads carrying the beads or pearls in such a manner that the needles pass above these threads in their forward movement to seize the binding-thread; second, a horizontal displacement alternately toward the right and left at the moment when the needles are in their rearward position in such a manner that each thread carrying beads or pearls thus receives a braiding motion and is held by the corresponding binding-thread when the needle after having seized the latter in its forward travel is returned to the rear; third, an angular displacement from below upward, which brings it back to its initial position. In this movement the comb leaves the threads carrying the beads or pearls, and the beads or pearls previously distributed by the forks $h^2$ slide along their threads until they reach the fabric or tissue.

The angular displacement of the shaft $o'$, which bears the comb $o$, is controlled by a lever $o^2$, which is controlled by a cam $o^3$, keyed on the shaft $b$. Moreover, the comb $o$ is capable of being displaced on its supports in a horizontal direction, and it receives this motion from a lever $p$, controlled by a cam $p'$, keyed on an intermediate shaft $q$, driven by the shaft $c$ at a speed reduced by one-half.

The descent of the beads or pearls along the thread $h$ is insured by a carrier $r$, consisting, for example, of a thread stretched on supports and receiving a motion in such a manner that it exerts a slight pressure on the threads $h$, while following the inclination of the latter. This motion is controlled by a lever $r'$, subjected to the action of a cam $r^2$, keyed on the shaft $b$.

The application of the beads or pearls to the fabric is effected by a comb $s$, mounted on a shaft $s'$, having an angular displacement. This motion is controlled by a cam $s^2$, keyed on the intermediate shaft $q$ and acting on an arm $s^3$, mounted on the shaft $s'$.

The machine can, moreover, comprise supplementary bars or straight-edges $t$, bearing-tubes $t'$, guiding a cord, a twist, &c., serving to ornament the fabric and secured to the latter by the binding-thread, as mentioned above.

Figure 5:
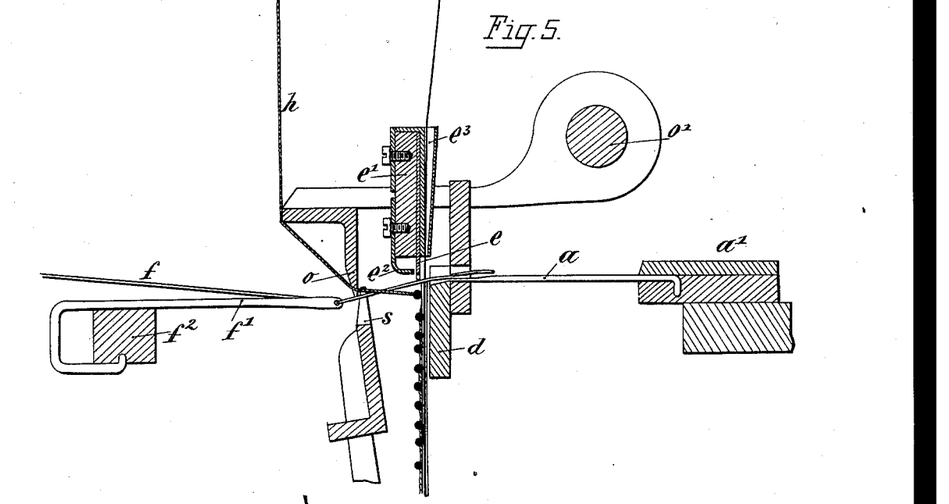
Figs. 5, 6, and 7 are detail views showing in transverse section the different relative positions of the essential parts of my improved apparatus.
Figure 6:
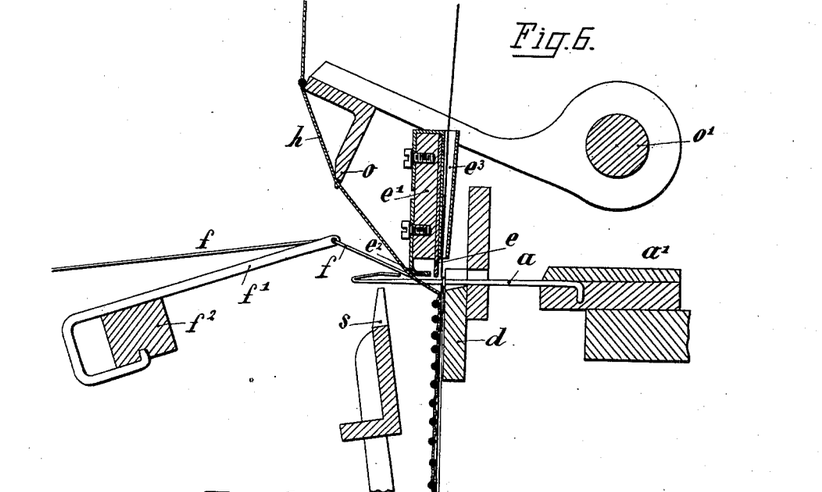
Figure 7:
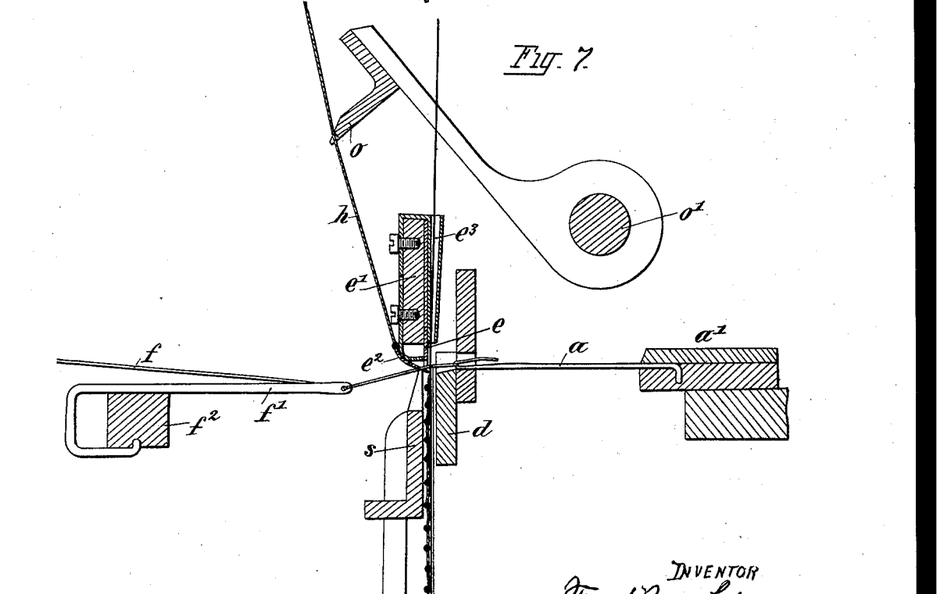
Figure 8:
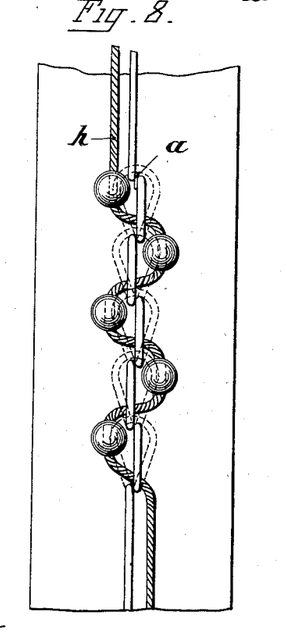
Figs. 8 and 9 show on the two faces of the fabric, to an enlarged scale, the formation of the stitch.
Figure 9:
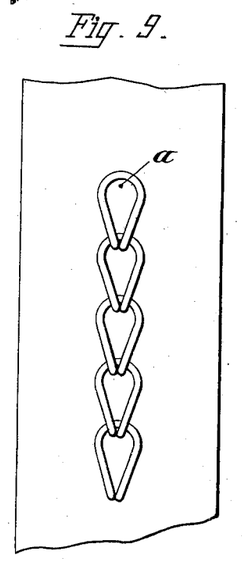

The operation of my improved machine is as follows: The apparatus being in the position shown in Fig. 5, the needles $a$ advance and pass through the fabric supported by the fixed bar or straight-edge $e$. At this moment the comb $o$ receives a longitudinal displacement toward the right, for example, and thus puts the threads $h$, carrying the beads or pearls, into position to be each seized in the eye or loop which the corresponding needle is about to form. The needles $a$ continue to advance, and the comb $o$ rises to allow the said needles to pass. When the needles $a$ have completed their forward travel, the looper $f'$ places the binding-threads $f$ on these needles, Fig. 6. The needles then return to the rear, Fig. 7. A little while before these needles reach the end of their rearward travel the comb $o$ releases the threads $h$, carrying the beads or pearls, and the beads or pearls distributed during the course of the operation by the forks $h^2$ slide along these threads. The carrier $r$ descends to insure their descent, and the said beads or pearls are applied to the fabric by the comb $s$, which receives an angular displacement. The needles $a$ then complete their backward travel, the chain-stitch is closed, and the beaded or pearled thread fixed onto the fabric. The fabric then receives a short motion, the needles $a$ again advance, the comb $o$ receives a longitudinal displacement to the left, and the formation of the next stitch takes place, as before. The same operations are thus reproduced successively, the threads $h$, carrying the beads or pearls, being drawn alternately to the right and to the left.

Figure 10A:
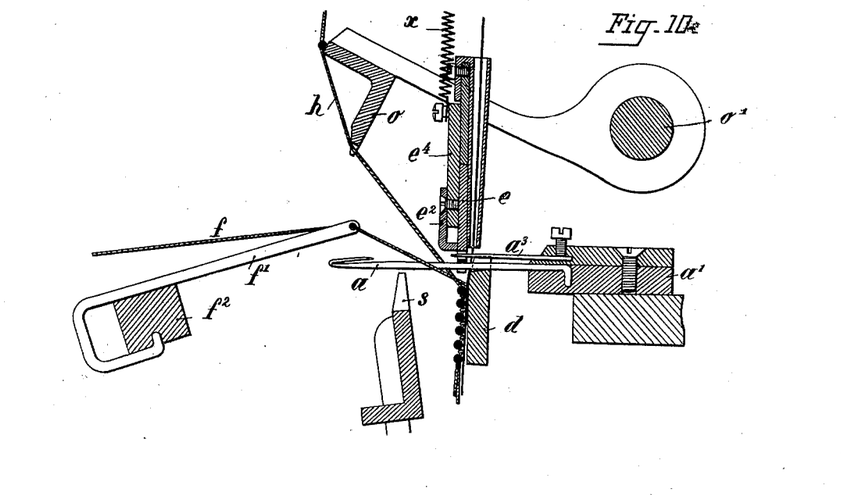
Figs. 10 and 11 show in transverse section the movable press raised and lowered.
Figure 11:
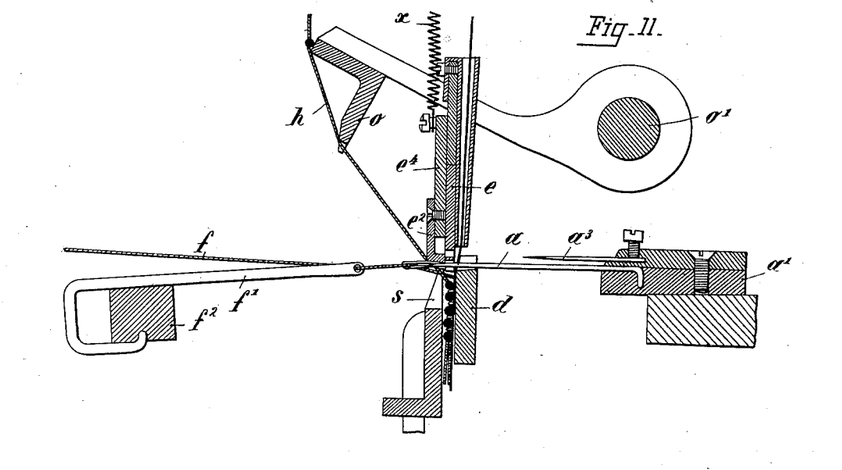
Figure 12:
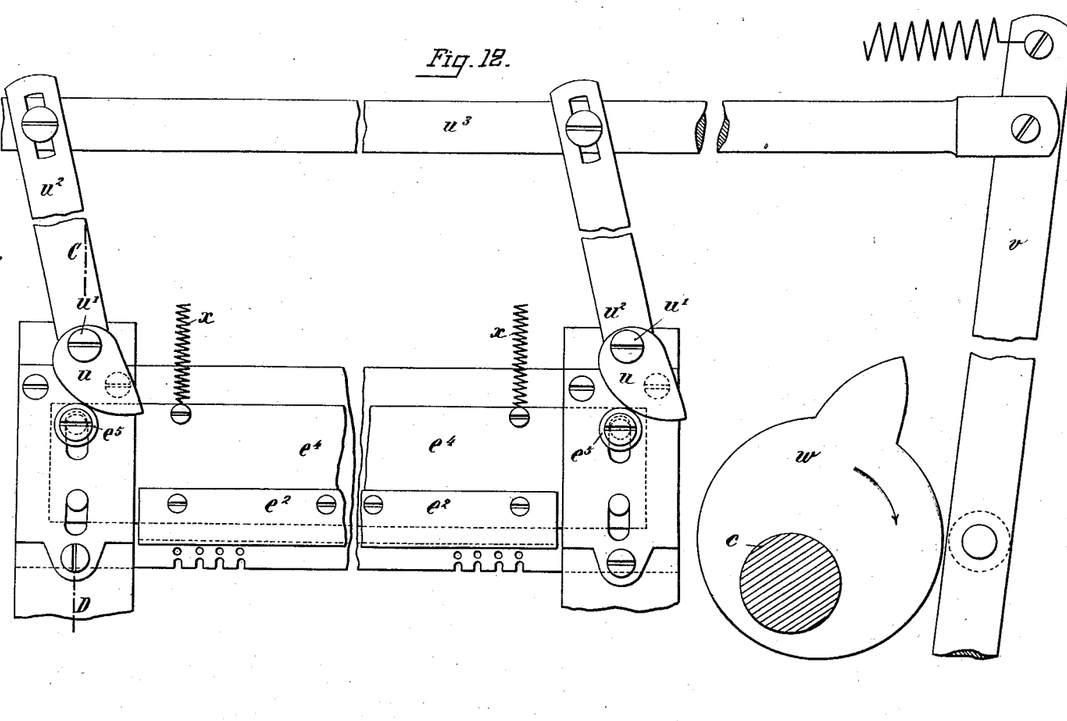
Fig. 12 shows in elevation the controlling apparatus of the movable press.
Figure 13:
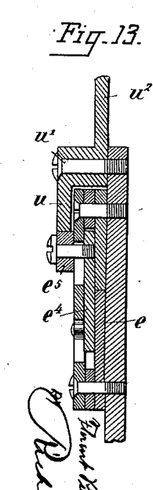
Fig. 13 is a vertical section on the line C D, Fig. 12.
Figure 14:
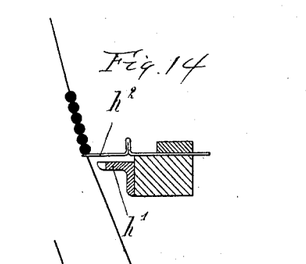
Figs. 14, 15, and 16 are views showing the manner of controlling the beads.
Figure 15:
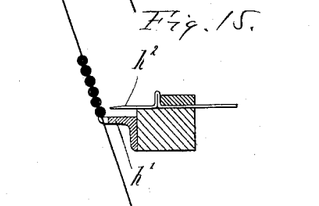
Figure 16:
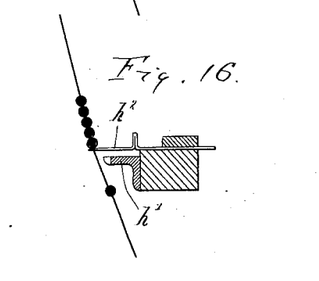

Figs. 10 to 13 show a modification, in which the press $e^2$ is movable in a vertical direction for the purpose of only pressing on the hook of the embroidering-needles $a$ at the moment of the backward motion of these needles. For this purpose the press $e^2$ is mounted on a bar or straight-edge $e^4$, sliding on the fixed bar $e$. The vertical movement of the press $e^2$ is controlled, as shown in Figs. 12 and 13, by two cams $u$, acting on two antifriction-rollers $e^5$, which carry the bar $e^4$. The said bar also is acted upon by two antagonistic springs $x$. The cams $u$, which are movable about their respective axes $u'$, each bear an arm $u^2$, pivotally connected to a rod $u^3$, which receives motion from a lever $v$, controlled by a cam $w$, keyed on the driving-shaft $c$. This arrangement is controlled in such a manner that the press $e^2$ is raised, Fig. 10, when the embroidering-needles advance to seize the binding-thread, and it only moves downward when the said embroidering-needles return to the rear, Fig. 11. It results from this arrangement that the wear of the needles is considerably reduced, since, as shown in Fig. 10, the bead or pearl can slide directly onto the fabric at the moment when it is distributed in such a manner that the stitch can never be formed so as to leave the bead or pearl outside.

When the fabric to be embroidered exceeds a certain thickness, each embroidering-needle is surmounted by a perforating-needle $a^3$, fitted into the needle-holder $a'$ and at a distance from this embroidering-needle equal to that through which the fabric advances at each operation in such a manner that each embroidering-needle $a$ in its forward motion to seize the binding-thread passes through the hole previously formed by the perforating-needle $a^3$, and thus no resistance is offered by the fabric.

The embroidering-needles, as well as the perforating-needles, instead of being mounted on the same bar or straight-edge, as above specified, can be actuated independently by a jacquard mechanism.

My improved apparatus thus permits the application of embroidery of all kinds with or without beads or pearls onto fabrics of all kinds, of all widths, of all thicknesses, and even of all materials, such as on leather, for example. It can be applied to all kinds of crochet or hook machines and on all kinds of machines making a chain-stitch, and I can modify the form, dimensions, and necessary arrangements according to the different purposes for which it is to be applied.

I claim—

1. In combination in an embroidery-machine with stitch-forming mechanism comprising a hook-needle and means for operating the same, of a rack for guiding the needles, a bar in front of said rack with a space between the same and the rack for the passage of the fabric, and a press or projection carried by said bar to close the hook of the needle, said bar serving to afford a rigid support for the fabric, substantially as described.

2. In combination in an embroidery-machine, with stitch-forming mechanism comprising a hook-needle and means for operating the same, of a rack for guiding the needles, a bar in front of said rack with a space between the same and the rack for the passage of the fabric, and a press or projection carried by said bar to close the hook of the needle, said bar serving to afford a rigid support for the fabric with means for moving the press or projection vertically on said bar and in relation to the path of the needle-hook, substantially as described.

3. In combination, the embroidery-needles, means for operating them, a bar having a rising-and-falling movement in relation to the needle and a movement laterally in relation thereto, a bar o for guiding and controlling the beaded thread with means for raising and lowering the same in relation to the needle and for moving the same laterally in relation to the needle, means for controlling the feed of the beads, including jacquard mechanism, substantially as described.

4. In combination, the embroidery-needles, means for operating them, a bar having a rising-and-falling movement in relation to the needle and a movement laterally in relation thereof, a bar o for guiding and controlling the beaded thread with means for raising and lowering the same in relation to the needle and for moving the same laterally in relation to the needle, means for controlling the feed of the beads, including jacquard mechanism and means for controlling the descent of the beads on the bead-threads consisting of the carrier r arranged to press slightly on the threads while following the course of the same, substantially as described.

5. In combination, the embroidery-needles, means for operating them, a feed-bar having a rising-and-falling movement in relation to the needle and a movement laterally in relation thereto, a bar o for guiding and controlling the beaded thread with means for raising and lowering the same in relation to the needle, and for moving the same laterally in relation to the needle, means for controlling the feed of the beads, including jacquard mechanism, and means for applying the beads to the fabric comprising a comb s with means for moving the same toward and from the fabric, substantially as described.

The foregoing specification of my improvements in embroidery-machines signed by me this 21st day of December, 1900.

FLORENT PIERRE LEDREUX.

Witnesses:
EDWARD P. MACLEAN,
MAURICE H. PIGNET.